UNITED STATES PATENT OFFICE.

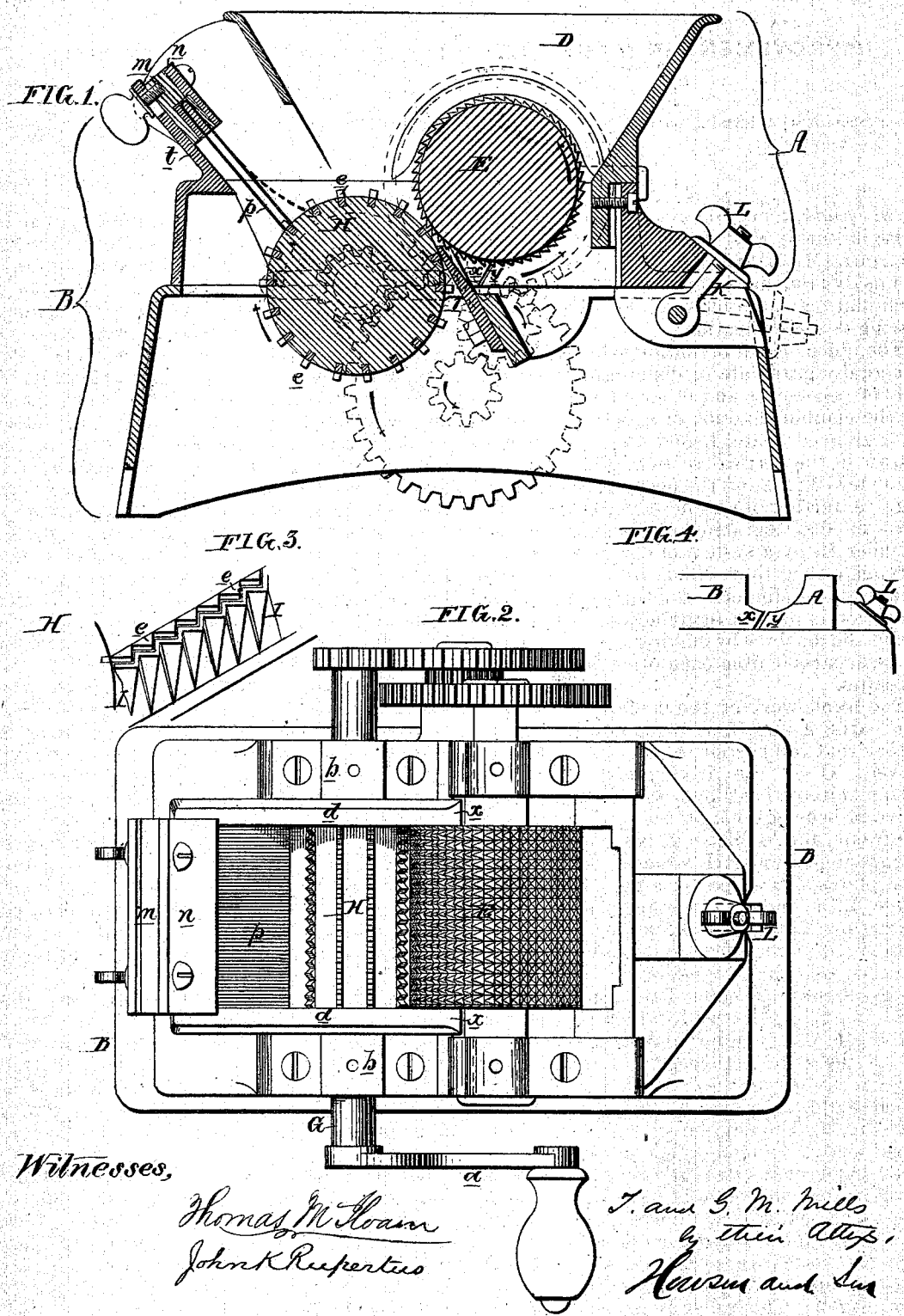

THOMAS MILLS AND GEORGE M. MILLS, OF PHILADELPHIA, PA.

IMPROVEMENT IN MACHINES FOR GRANULATING COCOA-NUTS.

Specification forming part of Letters Patent No. 139,804, dated June 10, 1873; application filed May 8, 1873.

*To all whom it may concern:*

Be it known that we, THOMAS MILLS and GEORGE M. MILLS, both of Philadelphia, Pennsylvania, have invented a Machine for Granulating Cocoa-nuts, &c., of which the following is a specification:

The object of our invention is to rapidly and effectually granulate or disintegrate the kernels of cocoa-nuts and other like substances, by the combined action of a toothed cylinder, H, a grooved plate, I, and toothed roller, E, shown in the vertical section, Figure 1, and plan view, Fig. 2, of the accompanying drawing. A further object of our invention is to clear the disintegrated kernels from the said cylinder H, by a system of elastic wires, $p$, so arranged that they will clear themselves as well as the cylinder. Another object of our invention is to gain ready access to the interior of the machine by making the same in two parts, separable from each other, as explained hereafter.

The frame-work of the machine consists of two parts, A and B, so fitted and secured together that the portion A can be readily removed. G is the driving-shaft, furnished with a suitable handle, $a$, and arranged to revolve in bearings $b\ b$, on the lower portion of the frame, and to this shaft is secured the disintegrating-cylinder H, situated between vertical plates $d\ d$, which form part of the lower frame B, the ends of the cylinder revolving in such close contact with the plates that no granulated material can pass between them. In grooves in the circumference of the cylinder are secured, at equal distances apart, bars $e$, having triangular teeth, which project from the face of the cylinder, and as the latter revolves the said teeth pass through angular grooves formed in the upper edge of an inclined plate, I, secured to the lower frame. (See Fig. 3.) The angular grooves in the plate correspond in number and shape with the teeth which pass close to the plate without being in absolute contact therewith. E is the feed-roller, which is so grooved, both circumferentially and in a direction parallel with its axis, that its entire surface is studded with small pointed teeth, as shown in the plan view, Fig. 2. This roller E is caused, by the wheels shown, or by any other suitable system of gearing, to revolve in the direction of the arrow, but at a much slower speed than that at which the disintegrating-cylinder H turns. The kernel of the cocoa-nut is broken into lumps and placed in the hopper D, which is attached to and forms a part of the upper portion A of the machine, but which is removed in the plan view, Fig. 2. While the roller E carries the lumps of kernel to the cylinder H, the teeth of the latter scrape away the kernel and carry the pieces downward until they are arrested by the plate I, through the grooves of which the teeth of the cylinder H must pass, and consequently must further disintegrate the pieces of kernel already torn from the lumps in the hopper. The particles of kernel carried down by the teeth of the cylinder H will fall into a suitable receptacle below, or will adhere to the cylinder, from which they are cleared in the manner described hereafter.

It will be seen that the disintegration of the kernel is accomplished partly by the preliminary scraping action of the teeth of the cylinder H on the lumps of kernel, as the latter are slowly fed to the cylinder and maintained in contact therewith by the slowly-revolving toothed roller E, and partly by the combined action of the teeth of the cylinder H and the recessed plate I, the efficiency of this action being insured by the presence of the feed-roller, which maintains the partially disintegrated kernel in a position to be acted upon by the teeth of the roller H in conjunction with the plate I.

It should here be understood that the upper edge of this plate is not only grooved in front for the passage of the teeth of the cylinder H, but also at the back, for the passage of the teeth of roller E, the teeth of the latter roller being of the same pitch as those of the said cylinder. (See perspective diagram, Fig. 3.)

Between two blocks, $m$ and $n$, are clamped rows of elastic wires, $p$, the blocks being so secured to the inclined plate $t$ forming part of the lower portion of the frame that they can be adjusted on the said plate and the ends of the wires moved in closer proximity to the circumference of the cylinder as they become worn.

It will be observed that the wires are arranged in an inclined plane, which, if continued, would pass a short distance from the axis of the cylinder H, so that, as the latter revolves, the wires will be moved upward a short distance before they are suddenly released, when they will recoil with such impetus as to throw all granulated kernel with which they are brought into contact against the inside of the frame, whence they fall into the receptacle below; in other words, the elastic wires not only serve to clear the cylinder, but also themselves of particles of kernel.

It is important that ready access should be had to the interior of the machine; hence we have made it in two portions separable from each other—the upper portion A carrying the hopper D and feed-roller E, while the rest of the mechanism is adapted to the lower portion B. Inclined projections $y$ on the upper portion of the frame fit in inclined recesses $x$, in the lower portion, as seen in the diagram, Fig. 4, and a bolt, K, hinged to the lower frame, has a thumb-nut, L, bearing in such a direction against the upper portion as will tend to wedge the projections $y$ into the recesses $x$. On loosening the nut L the bolt K can be turned down to the position shown by dotted lines, when the upper portion of the machine can be readily removed.

We claim as our invention—

1. The combination of the toothed cylinder H, the inclined grooved plate I, and the toothed roller E, the latter being arranged to revolve at a slower rate of speed than the said cylinder, and the whole being constructed and operating substantially in the manner described.

2. The combination, with the toothed cylinder H, of a series of elastic wires, arranged in respect to the axis of the roller substantially as set forth.

3. The elastic wires $p$ clamped to blocks $m$ and $n$, which are adjustable on the frame of the machine, as specified.

4. The beveled projections $y$ of the upper portion of the frame, adapted to corresponding recesses in the lower portion, in combination with a bolt, K, hinged to the lower portion and having a nut bearing against the upper portion in the manner described.

In testimony whereof we have signed our names to this specification in the presence of two subscribing witnesses.

THOMAS MILLS.
GEORGE M. MILLS.

Witnesses:
WM. A. STEEL,
HUBERT HOWSON.